Jan. 7, 1947.   G. E. HANNER   2,414,040
ADJUSTABLE HANDLE FOR THERMOSTATS
Filed June 26, 1945

INVENTOR.
George E. Hanner
BY
Stoodling and Krost
attys

Patented Jan. 7, 1947

2,414,040

UNITED STATES PATENT OFFICE 2,414,040

ADJUSTABLE HANDLE FOR THERMOSTATS

George E. Hanner, Mansfield, Ohio, assignor to Dominion Electrical Manufacturing, Inc., a corporation of Ohio Application June 26, 1945, Serial No. 601,700

6 Claims. (Cl. 74—525)

My invention relates to improvements in adjustment assemblies for thermostats, and in particular to an adjustable handle fastened to the temperature adjusting screw of thermostats.

It is an object of my invention to provide a thermostat adjustment assembly having an adjustable handle which may be used on electrical appliances of different sizes.

Another object of my invention is the provision of a handle which may be adjusted as to its length to accommodate appliances of different sizes.

A further object of my invention is the provision of an adjustable handle which may be fastened to the thermostat temperature adjusting screw for operating the screw from a remote point.

A still further object of my invention is the provision of an adjustable handle which may be fastened to the thermostat temperature adjusting screw after pre-set adjustments of the adjusting screw have been made and which may be used for regulating the screw through a range of operating temperatures.

Other objects and a fuller understanding of my invention may be had by referring to the following description and claims taken in conjunction with the accompanying drawing, in which:

Figure 1:
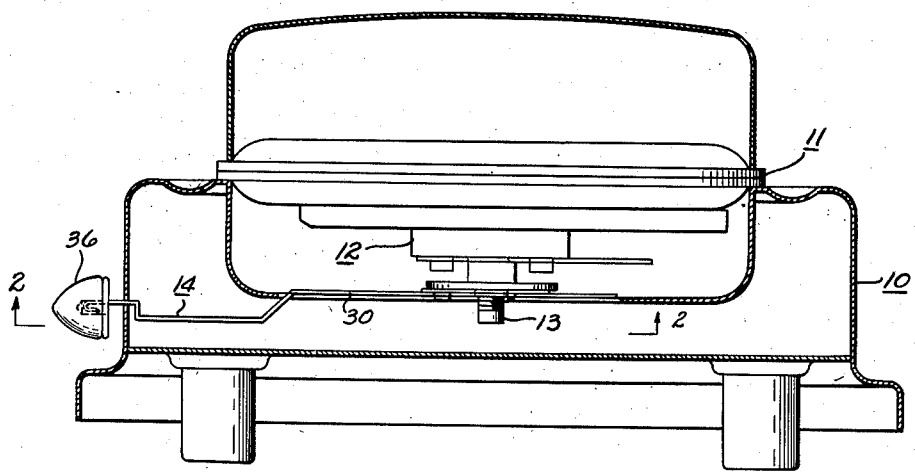
Figure 1 is a front elevational view of an electrical appliance embodying the features of my invention, parts being shown in cross-section.
Figure 2:
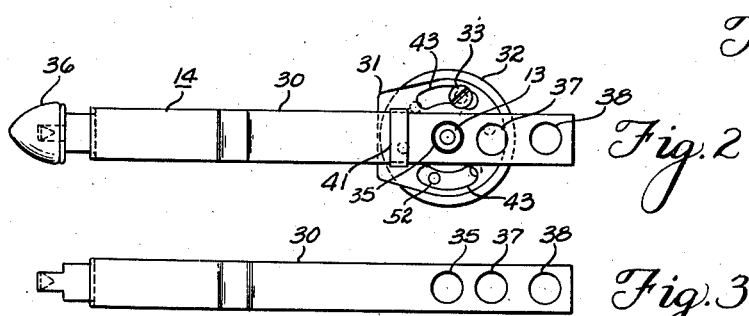
Figure 2 is a view taken along the line 2—2 of Figure 1 showing my adjustable handle fastened to the thermostat temperature adjusting screw.
Figure 3:
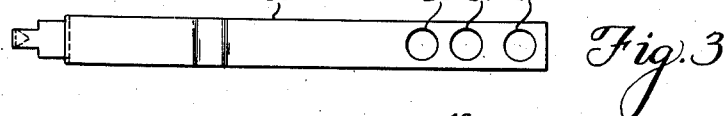
Figure 3 is a view of the lever arm used in my adjustable handle.
Figure 5:
Figure 5 is a cross-sectional view taken along the line 5—5 of Figure 4.
Figure 4:
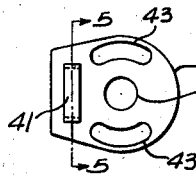
Figure 4 is a view of the handle plate which is fastened to the lever arm shown in Figure 3.
Figure 7:
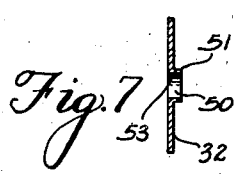
Figure 7 is a cross-sectional view taken along the line 7—7 of Figure 6.
Figure 6:
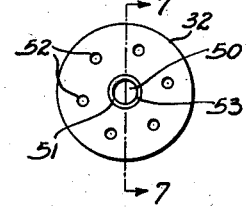
Figure 6 is a view of the thermostat plate which is fastened to the thermostat temperature adjusting screw.

With reference to my drawing, and in particular to Figure 1, the reference character 10 represents an electrical appliance, such as for example a waffle iron, which has a heated plate 11 controlled by a thermostat 12 having an adjusting temperature screw 13. My adjustable handle 14 is fastened to the thermostat temperature adjusting screw.

The adjustable handle 14, when fastened to the thermostat temperature adjusting screw 13, permits the operator to adjust the thermostat for the desired temperature of the appliance from outside the electrical appliance. My adjustable handle 14 comprises a lever arm 30, a handle plate 31, a thermostat plate 32 and a clamping screw 33. The handle plate 31 is fastened to the lever arm 30 and the thermostat plate 32 is fastened to the thermostat temperature adjusting screw 13. The clamping screw 33 operatingly connects the handle plate 31 and the thermostat plate 32. The clamping screw 33 may be a sheet metal screw or other suitable screw means which will clamp the plates together.

The lever arm 30 extends from the thermostat temperature adjusting screw 13 outwardly through the electrical appliance 10 and is terminated in a finger grip knob 36, providing manual control of the lever arm from outside the electrical appliance. The lever arm may be stamped from sheet metal or constructed by other suitable means. The internal end of the lever arm, or that end which encounters the thermostat, has openings 35, 37, and 38. The opening 35 is located nearest the knob and the opening 38 farthest from the knob. These openings are of substantially the same diameter and are longitudinally spaced at different operative lengths from the finger-tip control knob 36. If an adjustable handle having a medium operative length is required, the lever arm may be positioned with the thermostat temperature adjusting screw extending through opening 37. If an adjustable handle having a short operative length, such as illustrated in Figure 1 for a small electrical appliance is required, the thermostat temperature adjusting screw 13 may be extended through opening 35. If an adjustable handle having a long operative length is required, the lever arm may be positioned with thermostat temperature adjusting screw extending through opening 38. It is understood that only one of these longitudinally spaced openings will be used on any particular electrical appliance, but that the adjustable handle is interchangeable in electrical appliances of different sizes.

The handle plate 31, which is carried by the lever arm 30, has a center opening 40 and a raised fastening strap portion 41. The handle plate 31 may be stamped from sheet metal or otherwise constructed. The center opening 40 is substantially the same diameter as the openings 35, 37, and 38. The handle plate 31 has curved slots 43, which extend partially about the center opening 40. The clamp screw 33 extends through one of these slots and into the thermostat plate 32. I have used curved slots to permit angular adjustment of the operating handle with respect to the thermostat temperature adjusting screw 13.

The thermostat plate 32, which is fastened to the thermostat temperature adjusting screw 13, has an opening 50 in the center thereof with a flange 51 about that opening and extending from one side thereof. The inside surface of this flange and the opening 50 has reference character 53 and engages the surface of the said screw 13. This thermostat plate may be pressed onto the thermostat temperature adjusting screw, or the plate 32 may be fastened thereto by other suitable means. The thermostat plate 32 has holes 52 annularly spaced about the flange. These holes are located to permit the alignment of any two adjacent holes with one of the curved slots 43 in the handle plate 31. However, in actual practice, the clamp screw 33, which extends through the slot 43, engages only one of these holes 52.

In assembly, the thermostat plate 32 is pressed onto the thermostat temperature adjusting screw 13. The temperature adjusting screw 13 may be set approximately to the correct temperature before the handle 14 is fastened thereto. The adjustable handle 14 is positioned about the temperature adjusting screw with the handle plate 31 next adjacent the thermostat plate 32, and with the flange 51 extending through the opening 40 and the opening 35. The flange 51 serves as a pivot bearing for the angular adjustment of the adjustable handle. After the handle has been angularly positioned with respect to the adjusting thermostat temperature screw 13, the clamp screw 33 may be inserted through one of the curved slots 43 and into one of the holes 52. This set or clamp screw 33 may be tightened to operatively fasten the handle plate 31 to the thermostat plate 32, thus connecting the adjustable or operating handle 14 to the thermostat adjusting temperature screw 13. The operator may regulate the temperature of the heated plate 11 in the electrical appliance 10 by moving the handle 14 angularly about the electrical appliance.

Although I have described my invention with a certain degree of particularity in its preferred form, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An adjustable handle for a thermostat comprising, an arm having at least an opening therein, a first plate with a center opening in the center thereof and with at least an aligning opening near the circumference thereof, said first plate being fastened to the said arm with the center opening being aligned with said opening in the arm, a second plate having a center opening in the center thereof with a flange about the center opening and extending outwardly from the surface, said second plate having at least an aligning opening for alignment with the said aligning opening in the said first plate, fastening means cooperating with the said aligning openings for fastening the said plates together, said flange extending through said center opening of the first plate and engaging the arm, temperature adjusting screw means extending through the center opening of the second plate and engaging the thermostat, said screw means being fastened to the second plate whereby angular movement of the adjustable handle turns the screw means for regulating the thermostat.

2. In an adjustment mechanism for a thermostat employed in appliances of different sizes, a temperature adjusting screw for regulating the said thermostat, a thermostat plate carried by the temperature adjusting screw and having at least a hole therein, a lever arm having longitudinally spaced openings therein, said adjusting screw extending through one of the said spaced openings, handle plate means fastened to said lever arm and having slot means cooperating with the said hole for angularly aligning the said thermostat plate with the handle plate, screw means for insertion into the said slot and the said hole for operatively fastening the said plates together, whereby movement of the said lever arm turns the said temperature adjusting screw for regulating the thermostat.

3. In an adjustment mechanism for a thermostat employed in appliances of different sizes, said thermostat having a temperature adjusting screw, a thermostat plate carried by the temperature adjusting screw and having at least a hole therein, a lever arm having a handle plate fastened thereto, said lever arm having a plurality of longitudinally spaced openings on one end thereof to receive said adjusting screw, said openings providing means whereby the operative length of the lever arm may be regulated for appliances of different sizes, said handle plate having slot means cooperating with the said hole for angularly aligning the thermostat plate with the handle plate, screw means for insertion into the said slot and the said hole for operatively fastening the said plates together at a fixed angular position whereby movement of the said lever arm turns the temperature adjusting screw for regulating the thermostat.

4. In an adjustment mechanism for a thermostat employed in appliances of different sizes, a temperature adjusting screw for regulating the said thermostat, a thermostat plate carried by the temperature adjusting screw and having at least a hole therein, a lever arm for cooperating with the temperature adjusting screw to provide finger-tip control of the thermostat from a remote point, said lever arm having openings therein through which the said adjusting screw may extend, said openings providing means whereby the operative length of the lever arm may be regulated by extending the temperature adjusting screw through one of the openings in the lever arm, said lever arm having handle plate means fastened thereto, said handle plate means having slot means cooperating with the said hole for angularly aligning the said thermostat plate with the handle plate means, and clamping screw means for insertion into the said slot and the said hole for operatively fastening the said plates together at a fixed angular position with respect to the temperature adjusting screw.

5. A mechanism for operating a temperature adjusting screw for a thermostat employed in appliances of different sizes, said mechanism comprising a first plate member adapted to be fastened to the temperature adjusting screw, a lever arm having longitudinally spaced openings therein through which said adjusting screw may extend, said longitudinally spaced openings providing means for adjusting the operative length of the lever arm by extending the adjusting screw through one of the spaced openings in the lever arm, a second plate member non-rotatably mounted on said lever arm and longitudinally movable thereon, said second plate member and said first plate member providing means for angularly adjusting the lever arm with respect to the temperature adjusting screw, and means for fastening the plate members together at a fixed angular position.

6. A mechanism for operating a temperature adjusting screw for a thermostat employed in appliances of different sizes, said mechanism comprising, a lever arm having longitudinally spaced openings therein through which said adjusting screw may extend, said longitudinally spaced openings providing means for adjusting the operative length of the lever arm by extending the adjusting screw through one of the spaced openings in the lever arm, angular adjustment means for angularly adjusting the lever arm with respect to the temperature adjusting screw, said angular adjustment means operatively connecting the said lever arm to the temperature adjusting screw at a fixed angular position.

GEORGE E. HANNER.